United States Patent [19]
Gilmore et al.

[11] Patent Number: 5,561,664
[45] Date of Patent: Oct. 1, 1996

[54] METHOD OF REDUCING AUDIO DELAYS ASSOCIATED WITH MOBILE-TO-MOBILE COMMUNICATIONS

[75] Inventors: Merle Gilmore, Barrington; Valy Lev, Buffalo Grove; Paul Erickson, Palatine; Hooman Kashef, Hoffman Estates, all of Ill.

[73] Assignee: Motorola, Inc., Schaumburg, Ill.

[21] Appl. No.: 439,150

[22] Filed: May 11, 1995

[51] Int. Cl.$^6$ .................................... H04J 3/16
[52] U.S. Cl. .................... 370/17; 370/95.3; 455/54.1; 455/67.6
[58] Field of Search ................ 370/13, 17, 82, 370/84, 85.7, 94.1, 95.1, 95.3, 105.1, 105.2, 105.3, 108; 455/54.1, 33.1, 53.1, 34.1, 67.1, 34.2, 67.6; 379/56, 58, 63, 59; 340/825.01, 825.03, 825.06

[56] References Cited

U.S. PATENT DOCUMENTS

| | | | |
|---|---|---|---|
| 5,228,029 | 6/1993 | Kotzin | 370/95.1 |
| 5,299,199 | 3/1994 | Wilson et al. | 370/95.3 |
| 5,317,571 | 5/1994 | Marcel et al. | 370/103 |
| 5,335,356 | 8/1994 | Andersson | 455/54.1 |
| 5,355,368 | 10/1994 | Dore et al. | 370/95.3 |
| 5,483,537 | 1/1996 | Dupuy | 370/95.3 |

*Primary Examiner*—Alpus H. Hsu
*Assistant Examiner*—Ricky Ngo
*Attorney, Agent, or Firm*—James A. Coffing

[57] ABSTRACT

A TDMA radio communication system provides communication service to a plurality of mobile communication units through use of a TDMA frame. The TDMA frame includes a plurality of timeslots that are distributed across a TDMA frame duration and are used to facilitate communications involving a first mobile and a second mobile. Audio delays are reduced using a method that includes the steps of measuring a hold time for each of the mobiles, and determining a present aggregate hold time based at least in part on the measured hold times. When the present aggregate hold time exceeds the TDMA frame duration, the method provides for the re-assignment of at least one of the mobiles to an alternate timeslot within the TDMA frame.

19 Claims, 3 Drawing Sheets

5,561,664

METHOD OF REDUCING AUDIO DELAYS ASSOCIATED WITH MOBILE-TO-MOBILE COMMUNICATIONS

FIELD OF THE INVENTION

The present invention relates generally to reducing audio delays in radio communications, and in particular to such communications between two or mobile communication units.

BACKGROUND OF THE INVENTION

Time division multiple access (TDMA) radio communication systems are known to include a plurality of radio transceivers, or base stations, that provide radio communication service to a plurality of subscribers throughout a coverage area. These subscribers, which may be portable communication units or mobile communication units, travel throughout the coverage area and communicate with each other by sending radio frequency (RF) signals to a base station servicing their coverage area. These plurality of coverage areas are typically linked together, via a communication network that may include connections to the public switched telephone network (PSTN), and other non-public communication and signaling equipment. Other communication networks-may be entirely private. The base stations are linked to the communication network via a robust communication link, such as a T1 or T3 commonly carried on copper wires, optical fiber or coaxial links.

An exemplary communication system that is known in the art is shown in FIG. 1. Communication system 100 includes radio transceivers 102, 103, which provide communication service to their respective coverage areas. The radio transceivers 102, 103 are further linked to a communication network 106 via communication links 108, 109. In this manner, multiple radio transceivers with overlapping coverage areas can collectively provide a homogeneous, larger coverage area than an individual and isolated radio transceiver coverage area.

As an example of how radio communication service is provided to a coverage area, a first mobile 110 exchanges RF signals using a wireless communication resource 112. In this manner, radio coverage is provided throughout the coverage area being serviced by radio transceiver 102. Similarly, a second mobile 114 is provided radio communication service by radio transceiver 103 through the exchange of RF signals on wireless communication resource 116. In order to establish a communication path between the first mobile 110 and the second mobile 114—with the first mobile 110 as the requesting mobile for this service—the first mobile 110 exchanges RF signals with its serving radio transceiver 102 to notify and request communication services from the radio transceiver 102 and the communication network 106. In response to this request, the communication network 106 then locates and notifies the second mobile 114 by exchanging information with radio transceiver 103. If the second mobile 114 is available for the requested communication service, an end-to-end communication link is provided between the first mobile 110 and the second mobile 114 through radio links 112, 116, radio transceivers 102, 103, transmission links 108, 109 and the communication network 106.

Digital wireless communication networks that employ time division multiplex access (TDMA) techniques require the transmission and receipt of information over the radio link during a pre-determined time period (hereafter "timeslot"). Timeslots are generally constructed to repeat and become available at regular intervals, and hence radio transceivers and subscriber units can only transmit or receive information over the radio link during a pre-assigned timeslot. This process is commonly referred to as timeslot alignment. Further, the time that information arriving at the radio transceiver (e.g., 102) and destined for a mobile (e.g., 110) must wait (i.e., hold) until the next pre-assigned timeslot occurs is referred to herein as the "hold time", denoted $T_H$, as later described with reference to FIG. 2.

Each component in a digital wireless communication system (e.g., subscriber equipment, radio transceivers and communication network) exhibit a certain amount of processing delay, denoted $T_P$, i.e., the time required to process incoming and outgoing information. Additionally, the transmission links 108 and 109, as well as the communication network 106, present a certain amount of delay to propagating information, referred to herein as "network delay", and denoted $T_N$. It is well understood that audio delay is an inherent property of digital TDMA wireless communication systems and is primarily caused by the network delays, processing delay and hold time in the system.

Accordingly, a need exists for a TDMA based radio communication system that is not constrained by the shortcomings of the prior art. In particular, a signaling method that reduced the audio delays experienced during mobile to mobile communications would be an improvement over the prior art.

DETAILED DESCRIPTION OF A PREFERRED EMBODIMENT

The present invention encompasses a method of reducing an aggregate audio path delay for communications involving two or more mobile communication units in a TDMA radio communication system. The method includes the step of measuring a hold time corresponding to each of at least two mobile communication units. These measured hold times are then summed together to produce an aggregate hold time for the communication. The aggregate hold time is then compared to the duration of a single TDMA frame, and when the aggregate hold time exceeds that frame duration, at least one of the two mobile communication units is reassigned to an alternate timeslot within the TDMA frame. In this manner, the present invention serves to reduce the aggregate audio path delay experienced by two mobiles communicating with each other, by an amount equal to one TDMA frame duration.

Figure 1:
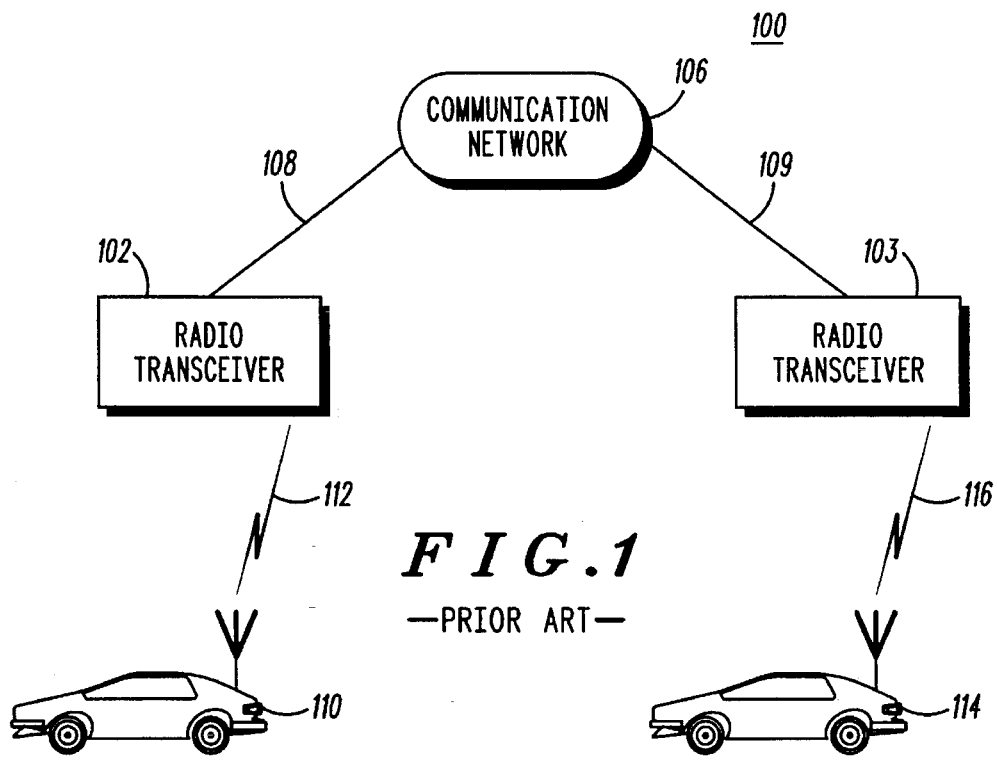
FIG. 1 shows a radio communication system, as is known in the art.
Figure 2:
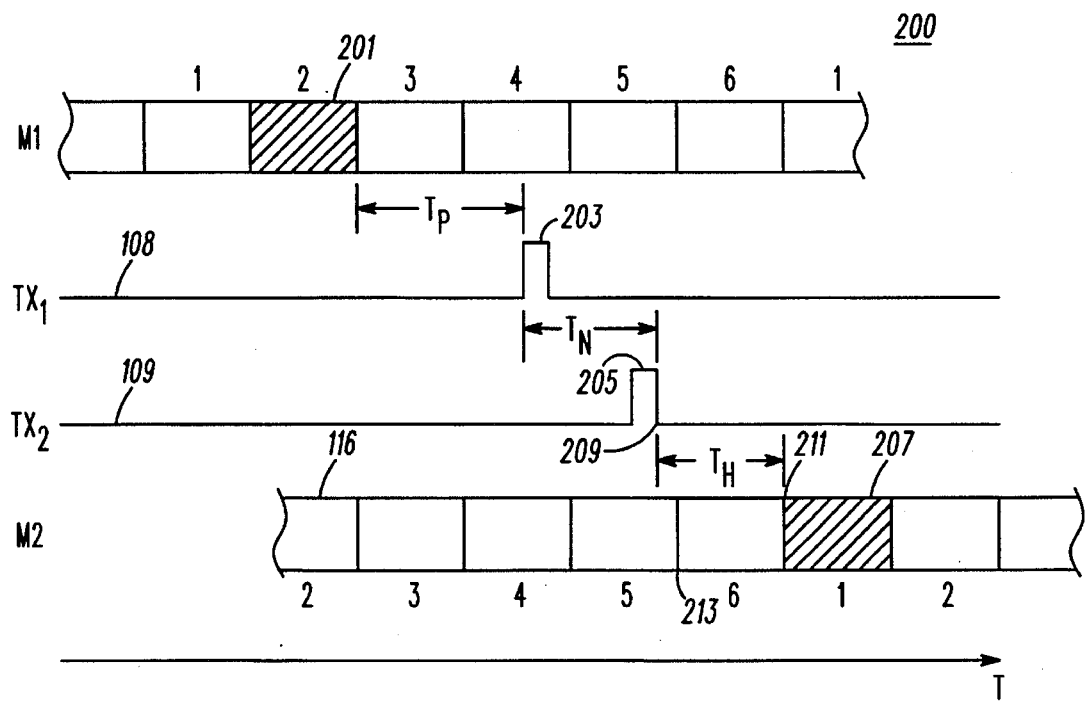
FIG. 2 shows a timing diagram that illustrates the multitude of audio delays that occur during transmission of information in a TDMA radio communication system.

FIG. 2 shows a timing diagram 200 that can be used to graphically depict the types of audio delays experienced during a typical communication between two mobiles (e.g., 110 to 114). As an example, consider a first mobile, M1, assigned timeslot position 2, transmitting information to a second mobile, M2, having been assigned timeslot position 1. The first mobile transmits information 201 in its assigned timeslot to its associated radio transceiver over the RF resource. After receipt, the information in timeslot 2 is processed by the sourcing transceiver for a duration $T_P$ and transmitted, via the sourcing communication link, as a signal burst 203 to the communication network. The sourcing communication link, the communication network, and a receiving communication link together contribute an additional delay, $T_N$. It should be noted that the communication links (e.g., 108, 109) operate at some rate such that the transmission time of the signal bursts take some time as depicted by signal bursts 203 and 205.

Upon receipt of the information, the receiving transceiver, having completely received the signal burst 205 at time 209, must hold that information for a time, $T_H$, until the next occurrence of timeslot 1 at time 211. The receiving transceiver then sends the information 207 via timeslot 1 in the RF channel to the receiving mobile, completing the communication path from the sourcing mobile to the receiving mobile. Thus, knowing the timeslots assigned to each mobile, the duration and number of timeslots per TDMA frame, the alignment of timeslot positions between the two transceivers, and the network and processing delays, the hold time may be determined.

It should be noted that while the timeslots at the sourcing and receiving transceivers are time-aligned as shown in FIG. 2, this needn't be the case. Alternate embodiments contemplate the use of transceivers that are not time-aligned, as well as transceivers having timeslots of different durations, varying frame durations, etc. In a preferred embodiment, however, the transceivers are time-aligned, and the TDMA frames each comprise six timeslots that are 15 milliseconds in duration.

Further, because the actual network delay is unknown, it is preferred that the receiving transceiver measure the hold time. In particular, since the coding format used in the preferred embodiment of the signal burst 205 is different than that used over the RF channel, the time period measurement begins at the completion time 209 of the signal burst 205 and ends at the timeslot boundary associated with the start time 211 of the assigned timeslot. It is understood that other embodiments may partially or completely preserve the format of the information in signal burst 205 and the assigned timeslot, and therefore could use different positions for the beginning and ending of the measured hold time. Furthermore, the hold time is preferably measured and then quantized downward to the largest integer number of equivalent timeslots (e.g., $T_H$ shown in FIG. 2 is quantized to 1 full timeslot as between times 213 and 211).

It is understood that the reverse communication path (e.g., from mobile 114 to mobile 110) undergoes a similar delay, whereby $T_P$ and $T_N$ are substantially the same, while $T_H$ depends on the arrival time of the information relative to the assigned timeslot for the receiving mobile. The component of the so-called return trip delay (i.e., the total delay associated with communicating one timeslot of information from one mobile to another and back) that is associated with hold times is referred to herein as the aggregate hold time, $T_A$. That is, the aggregate hold time, $T_A$, between two communicating mobiles is the sum of their respective hold times, as described with reference to FIG. 3. It is understood that the respective hold times for the sourcing and receiving mobiles are not necessarily the same, as the relation between arrival times and assigned timeslots is generally uncorrelated.

Figure 3:
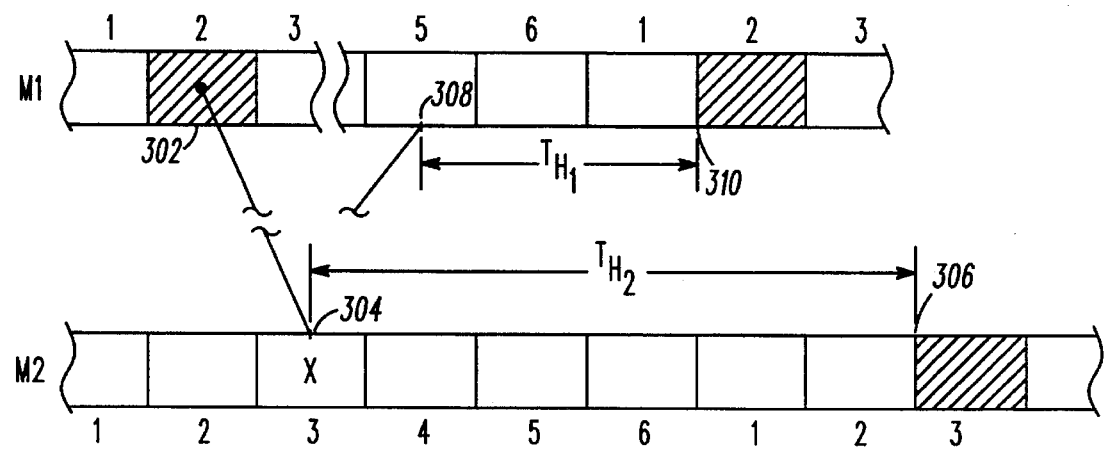
FIG. 3 shows a graphical depiction of the hold time delays experienced during a communication between two mobile communication units.

FIG. 3 shows the timeslot arrangements for two communicating mobiles, M1 and M2, and graphically depicts the hold times experienced by these mobiles during a communication. As an example of how the hold times are determined, it is assumed that a first mobile, M1, is assigned timeslot 2 for communications with its transceiver. Similarly, a second mobile, M2, is assigned timeslot 3 for communication with its respective transceiver. In a communication between M1 and M2, a first packet of information 302 is sent from M1. The packet of information 302 arrives at M2 at a time 304 (processing and network delays not shown). As shown, the information packet 302 arrives during the assigned timeslot for the receiving mobile, M2, and is therefore not usable at that time. Thus, M2 must wait until the next occurrence of its assigned timeslot (i.e., position 3) before the information packet 302 can be transmitted. The next assigned timeslot occurs at a time 306, after a hold time denoted as $T_{H2}$, which can be quantized to 5 timeslots as earlier described.

In similar fashion, when M1 receives transmissions from M2, they arrive at a time 308, as shown (again, network and processing delays not shown). As with M2, M1 must wait until its assigned timeslot (position 2, beginning at time 310). This constitutes an audio delay for M1, denoted by $T_{H1}$, which can be quantized to 2 timeslots as earlier described. An aggregate hold time, $T_A$, is defined herein as being the sum of $T_{H1}$ and $T_{H2}$—here, having a value of 7 timeslots.

In a TDMA system, the timeslots of a given mobile assignment occur periodically with a predetermined time period between the start of one assigned timeslot and the start of the next assigned timeslot. This period is commonly referred to as the frame duration, typically expressed in number of timeslots/frame, which is 6 timeslots in the example shown. Some communication networks and communication links operate synchronously such that the network delay for each signal burst from one transceiver to another is constant. Thus, the signal bursts are each delayed by the same amount and therefore arrive at substantially the same point within their repetition of the TDMA frame. Other networks could introduce some variation in the network delay from one signal burst to the next.

In typical applications (e.g., those not involving satellite links), the network delay variation is known to be less than a predetermined value, which is small compared to the TDMA frame duration. Moreover, recurring signal bursts for a particular communication (one direction) all tend to arrive at substantially the same point within the transceivers TDMA frame. Since the assigned slot in the transmitting TDMA frame occurs substantially periodically, the mobiles see relatively constant delays and the measured hold times vary in opposition with the variation in network delay. That is, when the network delay is longer, the hold times is shorter by the same amount, and vice-versa.

In an alternate embodiment, the measured hold time is first reduced by the anticipated maximum variation and then quantized, as earlier described. Other embodiments that account for variability, especially those that make statistical measurements and projections of the extreme value of the variation, are also contemplated.

Generally, the present invention requires an ability to determine when there is a better assignment of timeslots (i.e., one that produces a lower aggregate hold time for a communication). Accordingly, it is noted that when the aggregate hold time exceeds the number of timeslots in a TDMA frame, there exists a solution set of at least one whereby a re-assignment of one or both mobiles will reduce the aggregate hold time by exactly the number of timeslots in a TDMA frame.

According to the invention, the number of solutions is defined as the number of timeslot assignments that yield minimum aggregate hold times. This is accomplished as follows: first the number of solutions, S, is determined by subtracting the frame duration, D, from the aggregate hold time and adding 1 (i.e., $S=T_A-D+1$). It is noted that S ranges from 1 to 6, and represents the total number of possible re-assignments that will result in a lower aggregate hold time. Next, a first solution (identified as the number of timeslot positions required to shift from the present assigned timeslot) for one of the mobile assignments (arbitrarily selected). The number of required shift positions is determined by subtracting the individual hold time, $T_H$, for the selected site from the frame duration, D (i.e., $\#Shift=D-T_{Hx}$; where x is the ID of the arbitrarily selected site). Additional solutions are determined by adding 1 timeslot position to the first solution until the total number of solutions, S, are exhausted.

Figure 4:
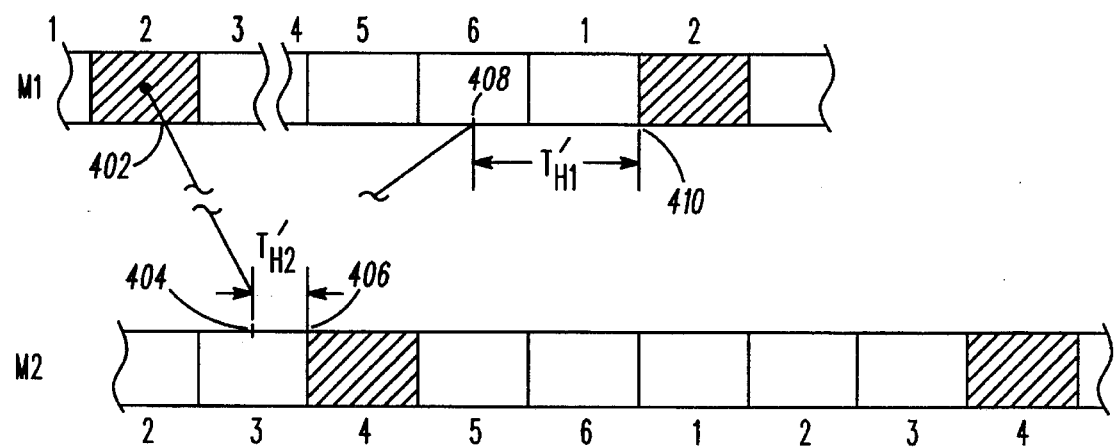
FIG. 4 shows a graphical depiction of the effective reduction in the aggregate hold times experienced by two communicating mobiles, in accordance with the present invention.

Applying the foregoing techniques, FIG. 4 shows how the aggregate hold time associated with the communication shown in FIG. 3 is reduced. In this example, the site servicing mobile M2 is selected, which has an individual hold time of 5, as shown in FIG. 3. The total number of solutions, S, is equal to $T_A-D+1$, or 2. By arbitrarily selecting the site servicing M2, the first solution in the solution set is determined to be a shift of D–5, or 1. That is, a shift from position 3 to position 4 would result in a reduced aggregate hold time. This is confirmed upon inspection of FIG. 4, where information packet 402 arrives at time 404, resulting in a new hold time, $T_{H2}'$, of 0 (i.e., a partial timeslot, between arrival time 404 and the beginning 406 of the newly assigned timeslot, quantized to 0 full timeslots). Similarly, the new hold time, $T_{H2}'$, associated with M1 has been reduced to 1 (i.e., quantized duration between arrival time 408 and the beginning 410 of the subsequent timeslot). It should be noted that shifting the assigned timeslot over 2 positions for the mobile M2 (i.e., to position 5) would also reduce the aggregate hold time (whereby $T_{H1}'$ would be 0 and $T_{H2}'$ would be 1).

While one solution is typically acceptable, alternate solutions are of interest since certain timeslots at a particular transceiver/site may not be available. For example, there may be another communication already occurring in the timeslot identified by the first solution. Thus, alternate solutions are attempted until a timeslot is found that is available. Alternate embodiments consider the possibility of moving the conflicting communication, especially when the other communication is not involved in a mobile-to-mobile call. Other reasons, such as fixed assignments of timeslots to other services (e.g., control signaling) also exist thereby making a particular timeslot unavailable for mobile-to-mobile calls at a given transceiver. It is also possible that all timeslots identified in the solution set are unavailable. When this occurs, the present invention provides for timeslot shifting at the site servicing the other mobile involved in the call. That is, the same solution set (e.g., shift 1, 2 or 3 timeslots over) can be used at the other site, where the shifted-to timeslots may be available.

Figure 5:
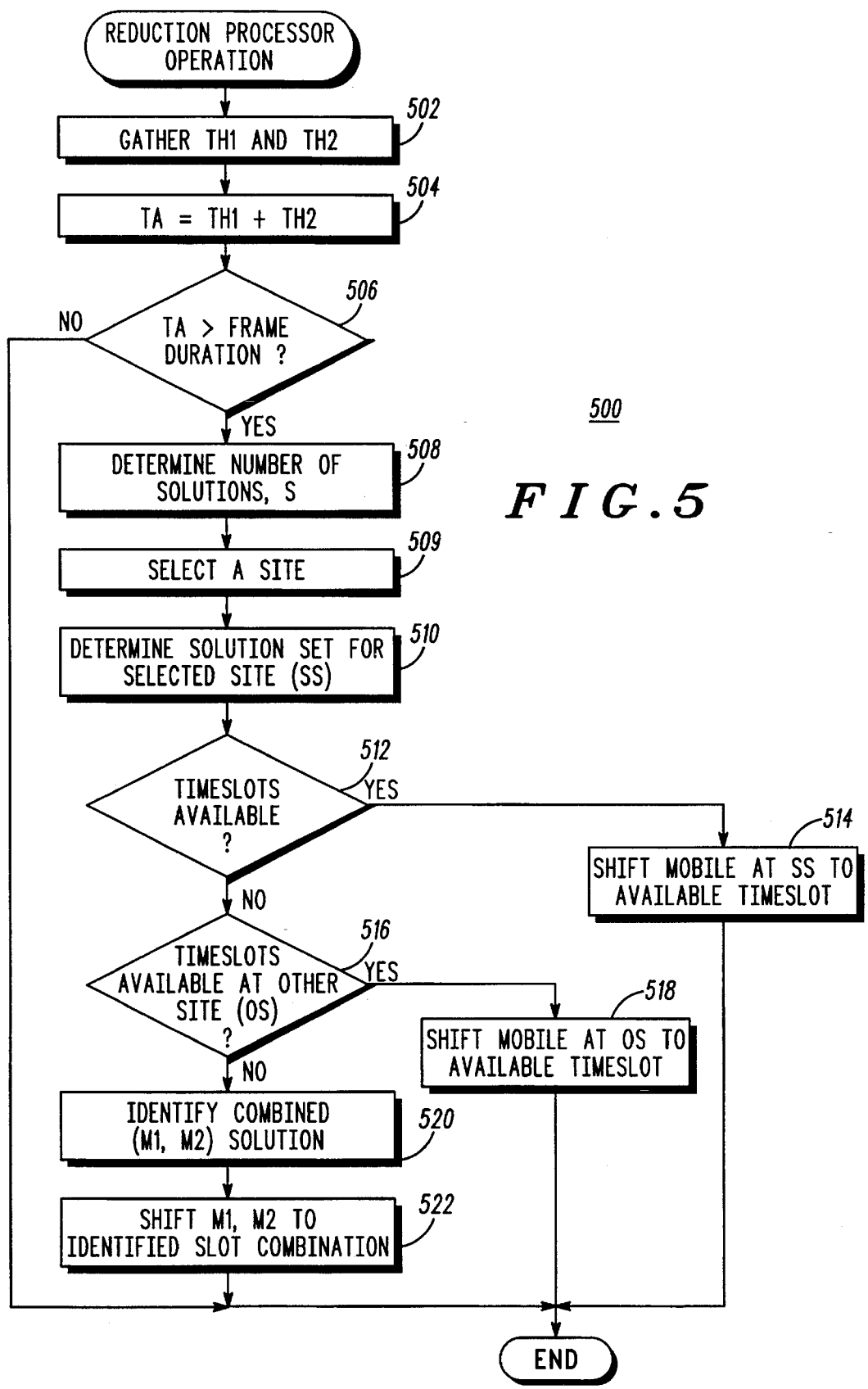
FIG. 5 shows a data flow diagram depicting the operation of a reduction processor, in accordance with the present invention.

FIG. 5 shows a data flow diagram 500 depicting the operation of a hold time reduction processor, in accordance with the present invention. It is noted that this reduction process can be implemented in a distributed manner or from a central control point. That is, the process may be implemented by a selected one of the transceivers (e.g., 102 and 103), jointly at both of the involved transceivers, or from a central processor (e.g., at the communication network 106). It is only important that the processing entity has available to it the currently assigned timeslot positions, the individual hold time measurements, as well as information regarding timeslot availability. In a preferred embodiment, each transceiver is capable of performing the reduction process, and a selection process is used to determine which transceiver performs the reduction task, while the other transceiver merely communicates the currently assigned timeslot, the present hold time and timeslot availability information, using known communication methods between transceivers.

Referring again to FIG. 5, the individual hold times $T_{H1}$ and $T_{H2}$ are gathered (502), and summed (504) to produce an aggregate hold time, $T_A$. The aggregate hold time is then compared (506) to the frame duration, D, expressed in number of timeslots. If the aggregate hold time is less than the frame duration, the routine is exited (i.e., as this is an indication that the aggregate hold time cannot be reduced). The number of solutions, S, is then determined (508), as earlier described, and one of the sites is selected (509), at which the first solution set will be attempted. For purposes of the present invention, the site selection may be arbitrary. However, in a preferred embodiment, the site having the smallest site ID number is selected. The solution set at the selected site (i.e., those timeslot re-assignments that produce a reduced aggregate delay) are then determined (510), as earlier described. These timeslots are then checked (512) for availability. If any of the timeslots in the solution set are available, the mobile at the selected site (SS) is shifted (514) to one of the available timeslots, and the 5 routine is exited.

In the event that none of the timeslots in the solution set are available at the selected site, the solution timeslots of the other site are identified (i.e., same relative shifting set) and checked (516) for availability. If any of those timeslots are found to be available, the associated mobile is shifted (518) to that timeslot, and the routine is exited.

As mentioned earlier, if there are no available timeslots at the second site, the procedure attempts to identify (520) a combination of available timeslots at both sites that will result in a reduced aggregate hold time. In a preferred embodiment, every combination of timeslots at the first site and the second site is considered, in iterative fashion, to determine whether that combination produces reduced audio delay and both respective timeslots are available. Alternate embodiments might check only those timeslots identified as belonging to the original solution set, rearrange the order of checking for availability, or even move one of the timeslot assignments and calculate a new solution set to check at the respective sites. After a combined solution is identified, both mobiles are shifted (522) to their respective re-assigned timeslots, and the routine is exited. Of course, if no combined solution is identified, this is an indication that no audio delay reduction is possible at this time, and the routine is exited.

It should be apparent from the above discussions that the foregoing procedure should be executed at the time that a new call is established. However, this approach could yield a determination that there is a better timeslot assignment, but which is momentarily unavailable. Accordingly, this procedure, or appropriate portions of it, could also be executed whenever a previously unavailable timeslot becomes available at each of the two sites. Similarly in a communication system that allows for the mobile to move from one site to another while involved in a mobile-to-mobile communication, this procedure could be executed upon the establishment of communications at the new site.

In the foregoing manner, the present invention reduces audio delays experienced during mobile-to-mobile communications. By measuring the hold times as seen at each site and applying a procedure that considers the hold times at each site, the aggregate hold time, the frame and timeslot duration, and the timeslot availability at each site, this procedure produces an optimal round trip delay in a deterministic manner. Accordingly, the present invention makes use of information at both involved sites to improve the audio delay performance as perceived by the communicating mobiles.

What is claimed is:

1. In a TDMA radio communication system that provides communication service to a plurality of mobile communication units through use of a TDMA frame that includes a plurality of timeslots distributed across a TDMA frame duration, a method of reducing an audio delay associated with communications involving a first mobile and a second mobile that are each assigned one of the plurality of timeslots, the method comprising the steps of:

measuring, for each of the first and second mobiles, a hold time to produce a measured first hold time and a measured second hold time;

determining a present aggregate hold time, based at least in part on the measured first and second hold times;

comparing the present aggregate hold time to the TDMA frame duration; and when the present aggregate hold time exceeds the TDMA frame duration, re-assigning at least one of the first and second mobiles to an alternate timeslot within the TDMA frame.

2. The method of claim 1, wherein the communication comprises a plurality of packets arriving substantially at an arrival time, for transmission, at an assigned transmission time, to a receiving one of the first and second mobiles, and wherein the step of measuring the hold time comprises the step of:

at the first mobile;

calculating a difference between the arrival time at the first mobile and the assigned transmission time for the first mobile, to produce the measured first hold time; and at the second mobile;

calculating a difference between the arrival time at the second mobile and the assigned transmission time for the second mobile, to produce the measured second hold time.

3. The method of claim 1, further comprising the step of adding a variation offset to at least the first measured hold time.

4. The method of claim 1, wherein the first and second measured hold times are quantized to an integer number of timeslots to produce a quantized first hold time and a quantized second hold time.

5. The method of claim 4, wherein the step of re-assigning comprises the step of determining a total number of solutions, S, as:

$$S = T_A - D + 1$$

where;

$T_A$=the present aggregate hold time, in timeslots; and $D$=the TDMA frame duration, in timeslots.

6. The method of claim 5, wherein the step of re-assigning further comprises the steps of:

selecting a site servicing one of the first and second mobiles to produce a selected site; and identifying at least one timeslot position, P1', by shifting a position, P1, of the timeslot presently assigned to the mobile serviced by the selected site by an amount given by:

$$D - T_{H1}$$

where;

$T_{H1}$=the quantized hold time associated with the mobile serviced by the selected site.

7. The method of claim 6, further comprising the step of identifying at least one additional position, P1", by adding one timeslot position to the position P1' until the total number of solutions, S, is exhausted.

8. The method of claim 6, further comprising the step of determining whether the timeslot corresponding to the position P1' is available for use by the mobile serviced by the selected site.

9. The method of claim 8, further comprising the step of:

when it is determined that the timeslot corresponding to the position P1' is unavailable, determining whether the timeslot corresponding to the at least one additional position P1" is available for use by the mobile serviced by the selected site.

10. The method of claim 9, further comprising the steps of:

when the timeslots corresponding to the positions P1' and P1" are unavailable, identifying at least one timeslot position, P2', by shifting a position, P2, of the timeslot presently assigned to the mobile serviced by a non-selected site by an amount given by:

$$D - T_{H2}$$

where;

$T_{H2}$=the quantized hold time associated with the mobile serviced by the non-selected site.

11. The method of claim 10, further comprising the steps of:

determining whether the timeslot corresponding to the position P2' is available for use by the mobile serviced by the non-selected site; and when the timeslot corresponding to P2' is unavailable, identifying at least one combination of timeslot positions among the selected and non-selected sites that, upon re-assignment of the mobiles being serviced by the selected and non-selected sites, results in a resultant aggregate hold time that is less than the present aggregate hold time.

12. In a TDMA radio communication system that provides communication service to a plurality of mobile communication units through use of a TDMA frame that includes a plurality of timeslots distributed across a TDMA frame duration, a method of reducing a present aggregate hold time for communications involving a first mobile and a second mobile that are each assigned one of the plurality of timeslots, the method comprising the steps of:

measuring, for each of the first and second mobiles, a hold time to produce a measured first hold time and a measured second hold time;

quantizing the measured first and second hold times to an integer number of timeslots to produce a quantized first hold time and a quantized second hold time;

summing the quantized first and second hold times to produce the present aggregate hold time;

comparing the present aggregate hold time to the TDMA frame duration; and when the present aggregate hold time exceeds the TDMA frame duration, re-assigning at least one of the first and second mobiles to an alternate timeslot within the TDMA frame.

13. The method of claim 12, wherein the step of reassigning further comprises the steps of:

selecting a first site servicing the first mobile; and identifying at least one timeslot position, P1', by shifting a position, P1, of the timeslot presently assigned to the first mobile by an amount given by:

$$D - T_{H1}$$

where;

D=the TDMA frame duration, in timeslots; and $T_{H1}$=the quantized first hold time.

14. The method of claim 13, further comprising the steps of:

determining a total number of solutions, S, as:

$$S = T_A - D + 1$$

where;

$T_A$=the present aggregate hold time, in timeslots; and identifying at least one additional position, P1", by adding one timeslot position to the position P1' until the total number of solutions, S, is exhausted.

15. The method of claim 14, further comprising the step of determining whether the timeslot corresponding to the position P1' is available for use by the first mobile.

16. The method of claim 15, further comprising the step of:

when it is determined that the timeslot corresponding to the position P1' is unavailable, determining whether the timeslot corresponding to the position P1" is available for use by the first mobile.

17. In a TDMA radio communication system that provides communication service to a plurality of mobile communication units through use of a TDMA frame that includes six timeslots, a method of reducing audio delays associated with communications involving a first mobile and a second mobile that are each assigned one of the six timeslots, the method comprising the steps of:

measuring, for each of the first and second mobiles, a hold time to produce a measured first hold time and a measured second hold time;

quantizing the measured first and second hold times to an integer number of timeslots to produce a quantized first hold time and a quantized second hold time;

summing the quantized first and second hold times to produce a quantized aggregate hold time;

when the quantized aggregate hold time value exceeds six, re-assigning at least one of the first and second mobiles to an alternate timeslot within the TDMA frame.

18. The method of claim 17, wherein the step of re-assigning further comprises the steps of:

selecting a site servicing one of the first and second mobiles to produce a selected site; and identifying at least one timeslot position, P1', by shifting the position, P1, of the timeslot presently assigned to the mobile serviced by the selected site by an amount given by:

$$6 - T_{H1}$$

where;

$T_{H1}$=the quantized first hold time.

19. In a TDMA radio communication system that provides communication service to a plurality of mobile communication units through use of a TDMA frame that includes a plurality of timeslots distributed across a TDMA frame duration, a method of reducing audio delays associated with communications involving a first mobile and a second mobile that are each assigned one of the plurality of timeslots, the method comprising the steps of:

measuring, for each of the first and second mobiles, a hold time to produce a measured first hold time and a measured second hold time;

quantizing the measured first and second hold times to an integer number of timeslots to produce a quantized first hold time and a quantized second hold time;

summing the quantized first and second hold times to produce a present aggregate hold time;

comparing the present aggregate hold time to the TDMA frame duration; and when the aggregate hold time exceeds the TDMA frame duration, re-assigning the first and second mobiles to alternate first and second timeslot positions within the TDMA frame, such that, upon re-assignment, a resultant aggregate hold time is produced that is less than the present aggregate hold time.

* * * * *